(12) United States Patent
Indrieri et al.

(10) Patent No.: US 12,267,693 B2
(45) Date of Patent: Apr. 1, 2025

(54) IN-BUILDING COVERAGE ANALYTICS USING MOBILE MEASURED DATA

(71) Applicant: T-Mobile Innovations LLC, Overland Park, KS (US)

(72) Inventors: Timothy Indrieri, San Ramon, CA (US); Gurpreet Singh, Manteca, CA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 448 days.

(21) Appl. No.: 17/864,021

(22) Filed: Jul. 13, 2022

(65) Prior Publication Data
US 2024/0022918 A1 Jan. 18, 2024

(51) Int. Cl.
H04W 16/18 (2009.01)
H04W 16/20 (2009.01)

(52) U.S. Cl.
CPC .................................. H04W 16/20 (2013.01)

(58) Field of Classification Search
CPC .................................................... H04W 16/20
See application file for complete search history.

(56) References Cited

U.S. PATENT DOCUMENTS

| 2008/0076430 A1* | 3/2008 | Olson | H04W 36/0085 455/440 |
| 2008/0220763 A1* | 9/2008 | Chapin | H04W 28/24 455/422.1 |
| 2023/0353260 A1* | 11/2023 | Zhang | H04W 4/30 |

* cited by examiner

Primary Examiner — Michael T Vu
(74) Attorney, Agent, or Firm — SHOOK, HARDY & BACON L.L.P.

(57) ABSTRACT

Methods and systems provide in-building coverage analytics from mobile measured data. In one embodiment, outlines of buildings in a region are obtained. The outline defines a footprint of the building in the region. The mobile measured data for the region is obtained. The mobile measured data indicates the levels of mobile coverage in the region. The roaming data for the region is obtained. The mobile measured data and the roaming data for each area within each building outline in the region is combined. Buildings having a poor in-building mobile coverage are identified based on the combined mobile measured data and the roaming data.

20 Claims, 5 Drawing Sheets

IN-BUILDING COVERAGE ANALYTICS USING MOBILE MEASURED DATA

BACKGROUND

Poor mobile coverage and/or spotty coverage in buildings is a ubiquitous problem. Connectivity issues from poor mobile coverage and/or spotty coverage are usually bad for businesses and productivity. Cellular transmissions and communications usually originate from a fixed location outside of a building. Poor mobile coverage and/or spotty coverage in buildings can be caused by, poor coverage due to building materials or destructive interference or geographical distance between the building and the nearest fixed location or the like. For example, if the fixed location is near the building, the building will likely have a good coverage, assuming the originating cell signal is strong enough to penetrate the building's physical structure. If the fixed location is further away, it is less likely that the signal is going to make its way through the building, resulting in a poor mobile coverage inside the building. In addition to signal distances, the building construction materials also contribute to a bad coverage inside buildings. Buildings that are made dense materials such as metal, tinted & low-E glass, or cement can contribute to poor coverage inside buildings.

If a building is identified that has a poor in-building coverage, users such as mobile companies can prioritize the building over other buildings and improve the in-building coverage using various methods. For example, users such as mobile companies can install cell phone towers close to the buildings, change characteristics in the nearest cell phone towers to boost signal strength going towards the building, co-sharing with other mobile users, or the like. If multiple buildings have poor coverage, a system and method is needed that can identify the buildings that would benefit the most with an improved in-building mobile coverage. A solution is needed that can provide an in-building coverage analytics to allow users to determine buildings having a bad in-building coverage.

SUMMARY

Embodiments of the present disclosure related to, among other things, a system and method to provide in-building mobile coverage analytics using mobile measured data. In particular, embodiments described herein obtain an outline of buildings in a region. Mobile measured data is obtained that indicate the quality of mobile coverage in the region. Roaming data is obtained for the region. For each area within the building outline, the mobile measured data is combined along with roaming data to identify high-priority buildings in the region with a poor in-building mobile coverage. Regions can be ranked based on the number of high-priority buildings having a poor in-building mobile coverage.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Mobile coverage inside buildings can be of a poor quality. Poor mobile coverage can cause sluggish data and poor call quality that can be an inconvenience for users inside the buildings. Poor mobile coverage inside buildings can be caused due to the distance of the building from the nearest signal source (such as a cell tower) or interferences that can block the signal between the signal source and the building. It is beneficial to identify buildings that have a poor in-building coverage. If multiple buildings have poor coverage, a system and method is needed that can rank the buildings based on mobile coverage data in order to identify the buildings that would benefit the most with an improved in-building mobile coverage. A solution is needed that can provide an in-building coverage analytics to allow users to determine buildings having a bad in-building coverage.

Accordingly, embodiments of the present disclosure are directed to employing techniques for identifying buildings having a poor in-building coverage using mobile measured data. The in-building coverage analytics system uses mobile measured data to determine rank buildings to determine buildings with a high-priority having a poor in-building coverage requiring the most attention, buildings with a medium-priority having a fair in-building coverage, and buildings with a low-priority having a good in-building coverage.

In a particular, to perform the in-building coverage analytics method, the in-building coverage analytics system identifies buildings in a region or in a plurality of regions. Mobile measured data for the region is obtained. In embodiments, mobile measured data such as Reference Signal Received Power (RSRP), Signal-to-Noise Ratio (SNR), Received Signal Strength Indicator (RSSI), Received Signal Received Quality (RSRQ) or the like can be used to determine mobile coverage inside the identified buildings. Additional data such as roaming data samples for the region is combined with the mobile measured data to determine the quality of mobile coverage inside of the building outlines for each building in the region or the plurality of regions. Roaming data occurs when another mobile provider's network is used for data transfer and/or phone calls. The buildings are ranked as a high-priority, medium-priority, or low priority based on the in-building mobile coverage determined from the mobile measured data and the roaming data in the building. Regions are ranked based on the number of high-priority buildings in the region. Users such as mobile companies can use this ranking to identify potential buildings to deploy solutions in order to improve in-building mobile coverage.

Figure 1:
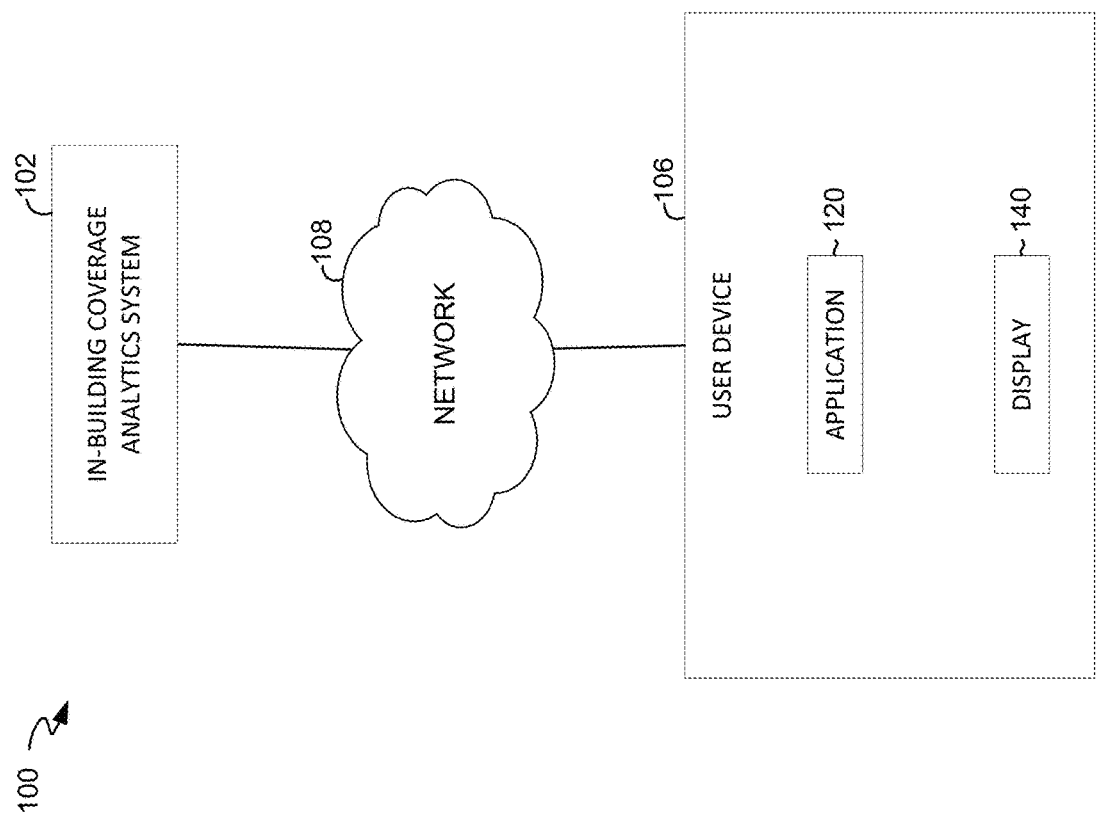
FIG. 1 is a diagram of an environment that can be used to perform the in-building coverage analytics method, according to embodiments of the present disclosure.

Turning to FIG. 1, FIG. 1 is a diagram of an environment 100 that can be used to perform the in-building coverage analytics method, according to embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 5.

Environment 100 is an example of a suitable architecture for implementing certain aspects of the present disclosure. In one embodiment, environment 100 includes, among other components not shown, an in-building coverage analytics system 102, and a user device 106. Each of the in-building coverage analytics system 102 and user device 106 shown in FIG. 1 can comprise one or more computer devices, such as the computing device 500 of FIG. 5 discussed below. The in-building coverage analytics system 102 may be embodied at least partially by the instructions corresponding to application 120. Therefore, the in-building coverage analytics system 102 can operate on a server or on a user device, such as user device 106, or partially on multiple devices. As shown in FIG. 1, the in-building coverage analytics system 102 and the user device 106 can communicate via a network 108, which may include, without limitation, one or more local area networks (LANs) and/or wide area networks (WANs). Such networking environments are commonplace in offices, enterprise-wide computer networks, intranets, and the Internet. It should be understood that any number of user devices and in-building coverage analytics systems may be employed within environment 100 within the scope of the present disclosure. Each may comprise a single device or multiple devices cooperating in a distributed environment. For instance, the in-building coverage analytics system 102 could be provided by multiple devices collectively providing the functionality of the in-building coverage analytics system 102 as described herein. Additionally, other components not shown may also be included within the network environment.

It should be understood that any number of user devices 106, in-building coverage analytics systems 102, and other components can be employed within the operating environment 100 within the scope of the present disclosure. Each can comprise a single device or multiple devices cooperating in a distributed environment.

User device 106 can be any type of computing device capable of being operated by a user. For example, in some implementations, user device 106 is the type of computing device described in relation to FIG. 5. By way of example and not limitation, a user device 106 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 106 can include one or more processors, and one or more computer-readable media. The computer-readable media may include computer-readable instructions executable by the one or more processors. The instructions may be embodied by one or more applications, such as application 120 shown in FIG. 1. Application 120 is referred to as a single application for simplicity, but its functionality can be embodied by one or more applications in practice. As indicated above, the other user devices can include one or more applications similar to application 120.

The application(s) may generally be any application capable of facilitating performance of in-building coverage analytics (e.g., via the exchange of information between the user devices and the in-building coverage analytics system 102). In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 120 can either initiate the in-building coverage analytics system 102 to facilitate in-building coverage analytics method via a set of operations initiated to display the in-building coverage analytics result on a display 140 of to the user device 106.

In embodiments, the in-building coverage analytics system 102 obtains an outline of buildings in a region or in a plurality of regions. The outline of the building represents a footprint, a location, or a shape of the building in the region. In some embodiments, the in-building coverage analytics system 102 uses software such as Microsoft® OpenStreetMap® that can provide building footprints for a region or a plurality of regions. In some embodiments, the in-building coverage analytics system 102 obtains an outline of buildings of a certain size in a region or in a plurality of regions. For example, the in-building coverage analytics system 102 obtains an outline of buildings that are more than 28,000 square feet. In one example, the in-building coverage analytics system 102 obtains a 2-Dimensional (2D) outline map of buildings in a region or in a plurality of regions. In another example, the in-building coverage analytics system 102 obtains a 3-Dimensional (3D) outline map of buildings in a region or in a plurality of regions. The 3D map of buildings can provide additional information of the buildings such as the number of floors in the building, the height of the building, the height of the building compared to additional buildings surrounding the building, location and height of geographical interferences near the building or the like. In some examples, the outline of the building is a 2D outline of the building. In another example, the outline of the building is a rough polygon that illustrates the location of the building in a region. In addition to the outline, the in-building coverage can receive additional information about the building such as the physical characteristics of the buildings (i.e. building materials, architecture of the building, number of windows, doors, or the like). The in-building coverage can also receive additional information such as destructive interferences near the building or geographical interferences between the building or the like.

In some embodiments, the in-building coverage analytics system 102 obtains mobile measured data for the region or the plurality of region. In other embodiments, the in-building coverage analytics system 102 obtains mobile measured data for areas outlines by the building outlines. In some embodiments, the in-building coverage analytics system 102 obtains a map illustrating the mobile measured data for different areas in the region. The mobile measured data can include any data such as Reference Signal Received Power (RSRP), Signal-to-Noise Ratio (SNR), Received Signal Strength Indicator (RSSI), Received Signal Received Quality (RSRQ) or the like. The mobile measured data can be used to determine the strength of mobile calls in different areas of the region. For example, in-building coverage analytics system 102 receives a map indicating areas of the region where the mobile measured data shows a poor mobile coverage, areas of the region where the mobile measured data shows a fair mobile coverage, and areas of the region where the mobile measured data shows a good mobile coverage. For example, areas in the regions having mobile measured data with an RSRP value of less than −118 dbm have a poor mobile coverage. RSRP is the average power received from a single reference signal. Usually areas having a mobile measured data of RSRP in the range of −140 dbm to −117 dbm will be areas that have very poor mobile coverage. In another example, for in-building coverage, an RSRP value of greater than or equal to −94 dB can indicate excellent Radio Frequency (RF) conditions in the building, an RSRP value of greater than or equal or −108 dB but less than −94 dB can indicate satisfactory RF conditions in the building, and an RSRP value of less than or equal to −115 dB can indicate poor RF coverage in the building. In one example, in a satisfactory RF condition in the building, phone calls can be made and messages can be send, however, the performance of the Download (DL) speed is not the best in a satisfactory RF condition as compared to the excellent RF condition in a building. In one example, −118 dB can be picked as a threshold value where areas in the regions having mobile measured data with an RSRP value of less than −118 dB have a poor mobile coverage. In another example, −115 dB can be picked as a threshold value where areas in the regions having mobile measured data with an RSRP value of less than −115 dB have a poor mobile coverage. It should be understood that any RSRP value can be picked as a threshold where RSRP values below that indicate a poor mobile coverage. The mobile measured data can be data accumulated over a certain period of time such as over 1 year, 6 months, 3 months, 1 month, a few weeks, a day, or a few hours or the like.

In some embodiments, the in-building coverage analytics system 102 obtains roaming data samples for the regions. In other embodiments, the in-building coverage analytics system 102 obtains roaming data samples for areas outlines by the building outlines. The in-building coverage analytics system 102 combines the mobile measured data with the roaming data samples within areas defined by each building outline. Based on the mobile measured data and the roaming data, the buildings can be grouped as either high-priority buildings, medium-priority buildings or low-priority buildings. For example, buildings having more than 10,000 samples of poor mobile coverage samples and roaming data samples may have a poor in-building coverage, buildings with 1000 to 10,000 samples of fair mobile coverage samples and roaming data samples may have a fair in-building coverage, and buildings with less than 1000 samples of good mobile coverage samples and roaming data samples may have a good in-building coverage. In one example, there is an interest to evaluate buildings having more than 10,000 poor mobile coverage samples along with roaming data samples in order to provide optimization or an indoor solution. One example of optimization can be to increase the electric tilts on the neighboring sites to an uptilt to provide better coverage in the area. Another example of optimization can be to change variables such as increase the Cell specific Reference Signal gain (CRSgain) parameter on a close cell site to increase the power of the signal. For example, the optimization of downlink resource element power allocation can lead to improved DL throughput, for example, in high dense networks. Other exemplary factors that can be controlled for optimization are setting the CRS Power boost in the range of +3 dB to −3 dB or boosting the Type-B resource element in the range (⅝, 1, ¾, ½). Variables such as the pdschtypebgain can also be changed to improve the throughput if the site has good or satisfactory RSRP. It should be understood that any other method of optimization can be used as well. Therefore, the buildings in the region can be ranked as buildings having a higher priority, medium-priority, and a low-priority where a higher priority can be indicated for buildings having a poor in-building coverage, a medium-priority can be indicated to buildings having a fair in-building coverage, and a low-priority can be indicated to buildings having a good in-building coverage. For 3D buildings, the in-building coverage analytics system 102 can analyze the mobile coverage on each floor or level of the building or can analyze the mobile coverage based on the surroundings (for e.g. tall structures around the building, hills or mountains around the building or the like).

In some embodiments, regions are ranked based on the largest number of high-priority buildings. These regions are ranked and provided to the end user through display 140.

In some embodiments, the in-building coverage analytics system 102 uses additional information to rank the buildings such as the building characteristics, building architecture, building materials, geographical interferences (such as a mountain, hill, tall structures next to the building) or the like. In another example, the in-building coverage analytics system 102 analyzes areas with a higher concentration of poor to medium in-building coverage and ranks areas with a higher concentration of poor to medium in-building coverage as a higher priority for attention.

For cloud-based implementations, the instructions on in-building coverage analytics system 102 may implement one or more aspects of the in-building coverage analytics system 102, and application 120 may be utilized by a user and/or system to interface with the functionality implemented on server(s). In some cases, application 120 comprises a web browser. In other cases, in-building coverage analytics system 102 may not be required. For example, the functionality described in relation to the in-building coverage analytics system 102 can be implemented completely on a user device, such as user device 106.

These components may be in addition to other components that provide further additional functions beyond the features described herein. The in-building coverage analytics system 102 can be implemented using one or more devices, one or more platforms with corresponding application programming interfaces, cloud infrastructure, and the like. While the in-building coverage analytics system 102 is shown separate from the user device 106 in the configuration of FIG. 1, it should be understood that in other configurations, some or all of the functions of the in-building coverage analytics system 102 can be provided on the user device 106.

Figure 2:
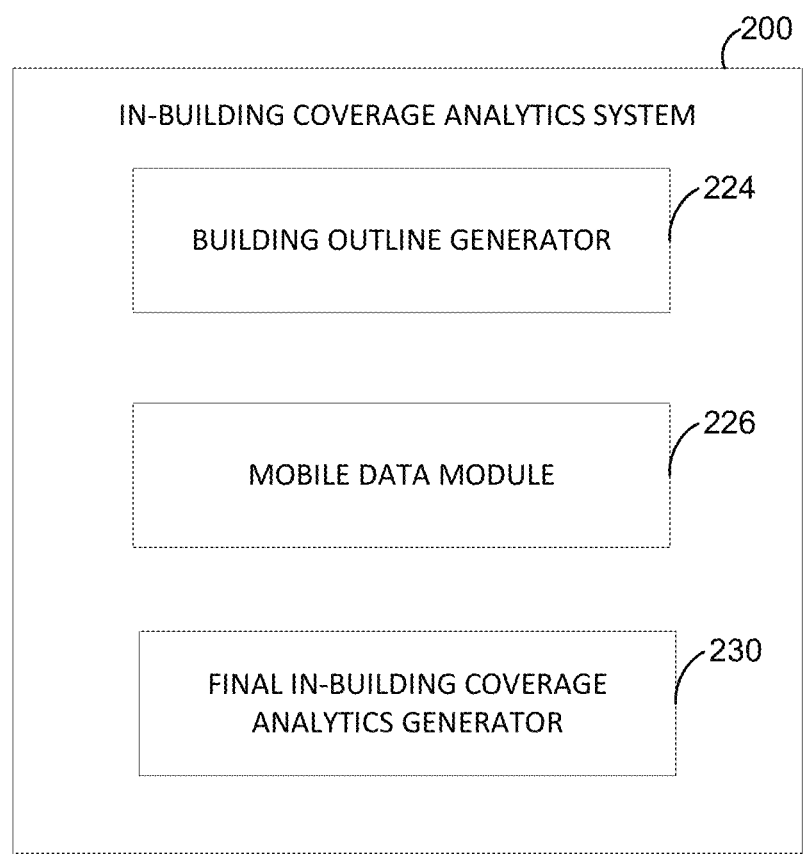
FIG. 2 provides an example in-building coverage analytics system, in accordance with embodiments described herein.

Turning to FIG. 2, FIG. 2 provides an example in-building coverage analytics system 200. As shown, an exemplary in-building coverage analytics system 200 includes a building outline generator 224, a mobile measured data module 226, and a final in-building coverage analytics generator 230. As can be appreciated, any number of components may be used to perform the various functionalities described herein.

In accordance with the in-building coverage analytics system 200, the building outline generator 224 provides an outline of buildings in a region or in a plurality of regions. In some embodiments, the building outline generator 224 obtains an outline of buildings of a certain size in a region or in a plurality of regions. The mobile measured data module 226 provides mobile measured data for the region or the plurality of region and roaming data for the region or plurality of regions. The final in-building coverage analytics generator 230 combines the outline of buildings along with the mobile measured data and the roaming data to identify buildings having a poor mobile coverage inside the buildings. The final in-building coverage analytics generator 230 ranks the buildings and regions based on the in-building mobile coverage.

Figure 3:
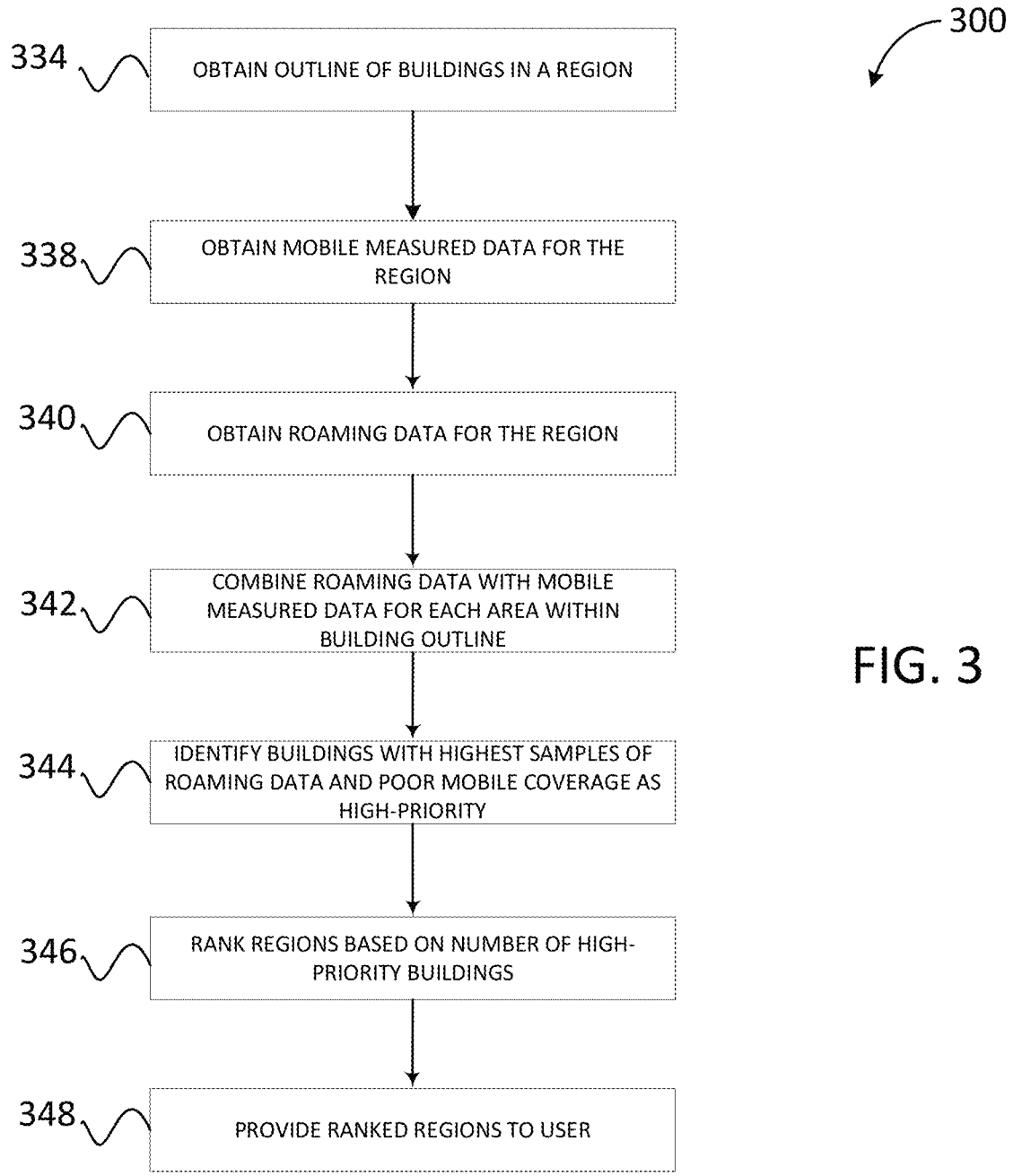
FIG. 3 is a flow diagram illustrating an exemplary method for implementing in-building mobile coverage analytics in accordance with one embodiment of the present disclosure.
Figure 4:
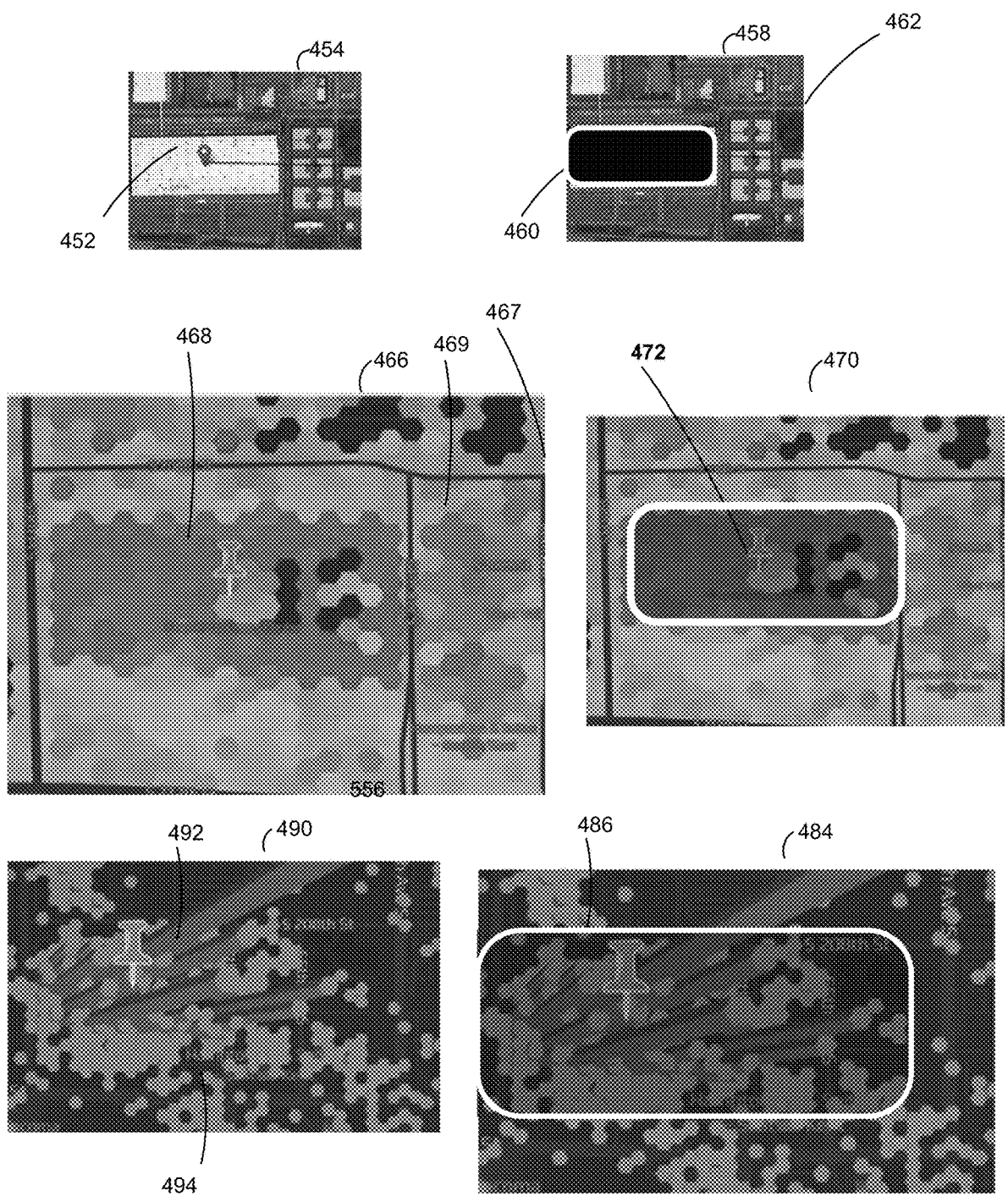
FIG. 4 are images illustrating one embodiment of an in-building mobile coverage analytics method in accordance to one embodiment of the present disclosure.

With reference to FIG. 3 and FIG. 4, FIG. 3 is a flow diagram illustrating an exemplary method 300 for facilitating in-building coverage analytics in accordance with one embodiment of the present disclosure. FIG. 4 provides images illustrative of aspects described herein. A processing device such as a user device, a server, a cloud computing service or the like implements the exemplary method 300. The in-building coverage analytics system can initiate the in-building mobile coverage analytics method 300 as described herein.

As shown in FIG. 3, in one embodiment, at block 334, an in-building coverage analytics system obtains an outline of buildings in a region. The in-building coverage analytics system can also obtain an outline of buildings for a plurality of regions. In some embodiments, the in-building coverage analytics system uses software such as Microsoft® OpenStreetMap® that can provide building footprints for a region or a plurality of regions. In some embodiments, the outline of the building is a map representing a footprint or location or shape of the building in the region. The outline could be 2-Dimensional (2D) or 3-Dimensional (3D). The outline could be any shape representing the location or footprint of the building in the region. For example, the outline can be a polygon, a circle, a 2D shape with one or more curves or the like. In some examples, only outlines of buildings of a certain size are obtained. For example, only buildings of size more than square feet in a region or a plurality of regions are obtained.

With further reference to FIG. 4, region 454 illustrates an exemplary region having one or more buildings. In one example, an outline 460 of a building 452 in the region as seen in 454 is provided as seen in image 458. In some examples, areas 462 outside of the building 452 are ignored. In other examples, areas outside the building that may cause interference of signals may be also taken into consideration.

The in-building coverage analytics system, at block 338, obtains mobile measured data for the region or the plurality of region. In some embodiments, the in-building coverage analytics system obtains a map illustrating the different levels of mobile measured data for different areas in the region. The mobile measured data can include any mobile data such as RSRP, SNR, RSSI, RSRQ or the like. The mobile measured data can be used to determine the strength of mobile calls in the regions.

With further reference to FIG. 4, image 466 illustrates an exemplary map of the region 454 showing mobile measured data. In one example, the hexagons represent different levels. Areas in the region with poor mobile data coverage are indicated in hexagons such as 468. Areas in the region with fair mobile data coverage are indicated in hexagons such as 469. Areas in the region with good mobile data coverage are indicated in hexagons such as 467.

The in-building coverage analytics system, at block 340, obtains roaming data for the region. With further reference to FIG. 4, image 490 illustrates an exemplary roaming data for region 454. As seen in image 490, some areas with a longer bars 492 have a higher roaming samples than areas with shorter bars 494.

The in-building coverage analytics system, at block 342, for each building in the region combines the mobile measured data with the roaming data for the area within the outline of the building. For example, at block 340, the in-building coverage analytics system calculates the total number of samples from the mobile measured data having a poor mobile coverage and add the poor mobile coverage samples to the roaming data samples.

The in-building coverage analytics system, at block 344, identifies buildings with highest samples of roaming data and poor mobile coverage as high-priority buildings. For example, the in-building coverage analytics system determines that in building A, there were 104,435 samples having very poor RSRP values (i.e. 104,435 samples have values in the range below −118 dbm) and 6611 roaming data samples. Therefore, the building has total 104,435+6611=111,046 poor mobile coverage samples. The in-building coverage analytics system determines that in building B, there were 5,034 samples having very poor RSRP values (i.e. 5,034 samples have values in the range below −118 dbm) and 232 roaming data samples. Therefore, building B has a total of 5,034+232=5,266 poor mobile coverage samples. The in-building coverage analytics system determines that in building C, there were 432 samples having very poor RSRP values (i.e. 432 samples have values in the range below −118 dbm) and 21 roaming data samples. Therefore, building C has a total of 432+21=453 poor mobile coverage samples. In one example, the poor coverage samples and the roaming data samples inside a building are combined to determine the areas where a solution is needed to improve the mobile coverage or where a network optimization can be performed. These allow the system to identify areas of interest where a solution can be provided to improve the mobile coverage.

If buildings have measured mobile data with fair coverage, the fair coverage sample data is combined with the roaming data samples in the area. For example, if building D has 4,721 samples of fair coverage and 89 samples of roaming data, building D has total of 4,819 samples of fair mobile coverage samples. If buildings have measured mobile data with good coverage, the good coverage sample data is combined with the roaming data samples in the area. For example, if building E has 10,331 samples of fair coverage and 31 samples of roaming data, building D has total of 10,362 samples of fair mobile coverage samples.

With further reference to FIG. 4, image 470 illustrates an exemplary map of the region 454 showing mobile measured data samples in the building outline 460 and image 484 illustrates an exemplary map of the region 454 showing roaming data samples in the building outline 460. In one example, the hexagons represent different levels. The mobile measured samples in 472 are added to the roaming data samples in 486 to determine whether building 452 is a high-priority building.

The in-building coverage system, at block 346, ranks regions based on the number of high-priority buildings. An exemplary table of buildings ranked based of priority is illustrated in Table 1 below:

TABLE 1

| Region | Total Buildings > 28,000 Square Feet | High-priority > 10,000 samples | Medium-priority 1000 to 10,000 samples | Low-priority < 1000 samples |
|---|---|---|---|---|
| New York | 11,102 | 75 | 629 | 10,398 |
| Shanghai | 9,581 | 40 | 440 | 9,101 |
| Beijing | 15,391 | 39 | 458 | 14,894 |
| New Jersey | 12,494 | 33 | 323 | 12,138 |
| Boston | 4,231 | 17 | 263 | 3,951 |
| Chicago | 1,783 | 14 | 656 | 1,113 |
| Kansas City | 1,031 | 8 | 115 | 908 |
| St. Louis | 301 | 1 | 45 | 255 |

As seen in Table 1, the regions can be ranked based on the largest number of buildings with a high-priority. For example, New York had the highest number of buildings with a high priority (i.e. 75 buildings). The second highest number of buildings having a high priority was in Shanghai. These regions having the largest number of higher priority ranked buildings provide the most potential opportunities to improve in-building mobile coverage. These regions can be further ranked based on whether there is a solution within a certain radius around the building or whether there is a low bank on air close to the buildings or the like. Solutions can be deployed in these regions to provide the best opportunities to assist buildings having poor in-building coverage. These rankings can help users decide which sites are underserved sites, which sites can include a low band for the bet serving sector, and the like.

Figure 5:
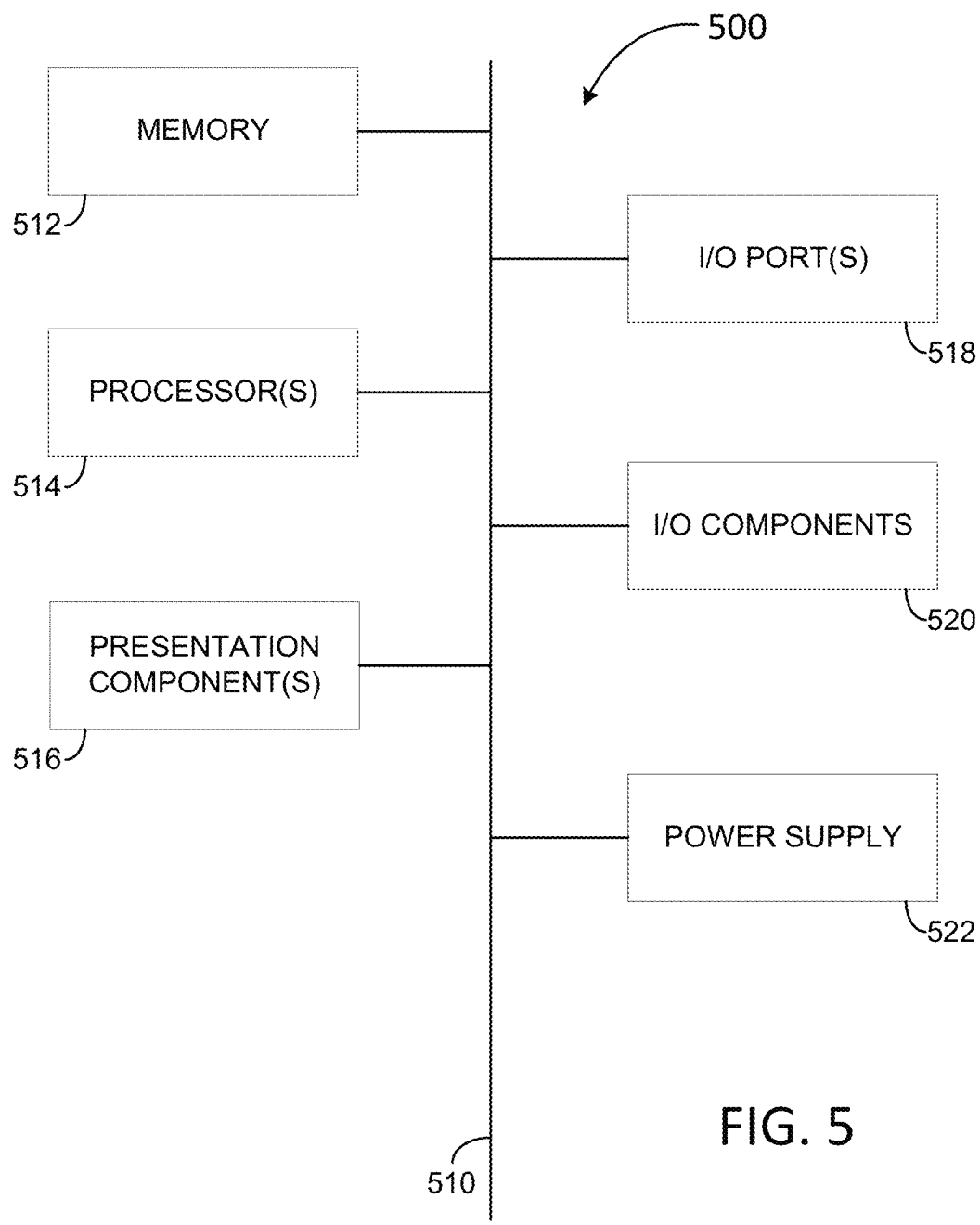
FIG. 5 is an exemplary operating environment for implementing embodiments of the present technology.

Having described implementations of the present disclosure, an exemplary operating environment in which embodiments of the present technology may be implemented is described below in order to provide a general context for various aspects of the present disclosure. Referring to FIG. 5, an exemplary operating environment for implementing embodiments of the present technology is shown and designated generally as computing device 500. Computing device 500 is but one example of a suitable computing environment and is not intended to suggest any limitation as to the scope of use or functionality of the technology described herein. Neither should the computing device 500 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology described herein may be practiced in a variety of system configurations, including hand-held devices, consumer electronics, general-purpose computers, more specialty computing devices, etc. The technology described herein may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user and/or system or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user and/or system interface (NUI) that processes air gestures, voice, or other physiological inputs generated by a user and/or system. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion.

Aspects of the present technology have been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing certain embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for analyzing in-building mobile coverage, the method comprising:
   obtaining outlines of buildings in a region, each outline defining a footprint of a corresponding building in the region;
   obtaining mobile measured data for the region, the mobile measured data indicating levels of mobile coverage in the region;
   obtaining roaming data for the region;
   combining the mobile measured data and the roaming data for each area within each building outline in the region; and
   identifying buildings having a poor in-building mobile coverage based on the combined mobile measured data and the roaming data.

2. The method of claim 1, wherein the levels of mobile coverage include a poor mobile coverage, a fair mobile coverage, and a good mobile coverage.

3. The method of claim 1, wherein the mobile measured data having an RSRP value of less than −118 dbm indicates a poor mobile coverage.

4. The method of claim 1, wherein combining the mobile measured data and the roaming data further includes:
   adding samples from the mobile measured data and samples from the roaming data for each area within each building outline.

5. The method of claim 1, wherein the outline can be 2-Dimensional or 3-Dimensional.

6. The method of claim 1, further comprising:
   combining the mobile measured data and the roaming data for each floor level of the building.

7. The method of claim 1, further comprising:
   ranking two or more regions based on a number of the identified buildings having poor in-building mobile coverage.

8. The method of claim 1, wherein the building is identified as a high-priority when a number of samples of the combined mobile measured data and the roaming data is more than 10,000.

9. The method of claim 1, wherein the building is identified as a medium-priority when a number of samples of the combined mobile measured data and the roaming data is between 1000 to 10,000.

10. A computer-implemented method for ranking regions based on in-building mobile coverage, the method comprising:
obtaining outlines of buildings in a region, each outline defining a footprint of a corresponding building in the region;
obtaining mobile measured data for the region, the mobile measured data indicating levels of mobile coverage in the region;
obtaining roaming data for the region;
combining the mobile measured data and the roaming data for each area within each building outline in the region;
identifying buildings having a poor in-building mobile coverage based on the combined mobile measured data and the roaming data; and
ranking two or more regions based on a number of the identified buildings having a poor in-building mobile coverage.

11. The method of claim 10, wherein the outline is a polygon.

12. The method of claim 10, wherein the levels of mobile coverage include the poor mobile coverage, a fair mobile coverage, and a good mobile coverage.

13. The method of claim 12, wherein the mobile measured data having an RSRP value of less than −118 dbm indicates the poor mobile coverage.

14. The method of claim 10, wherein combining the mobile measured data and the roaming data further includes:
adding samples from the mobile measured data and samples from the roaming data for each area within each building outline.

15. The method of claim 10, wherein the outline can be 2-Dimensional or 3-Dimensional.

16. The method of claim 10 further comprising:
combining the mobile measured data and the roaming data for each floor level of the building.

17. The method of claim 10, further comprising:
ranking the regions based on the number identified buildings having the poor in-building mobile coverage.

18. The method of claim 10, wherein the building is identified as a high-priority when a number of samples of the combined mobile measured data and the roaming data is more than 10,000.

19. The method of claim 10, wherein the building is identified as a medium-priority when a number of samples of the combined mobile measured data and the roaming data is between 1000 to 10,000.

20. A system comprising:
a memory device; and
a processing device, operatively coupled to the memory device, to perform operations comprising:
obtaining outlines of buildings in a region, each outline defining a footprint of a corresponding building in the region;
obtaining mobile measured data for the region, the mobile measured data indicating levels of mobile coverage in the region;
obtaining roaming data for the region;
combining the mobile measured data and the roaming data for each area within each building outline in the region;
identifying buildings having a poor in-building mobile coverage based on the combined mobile measured data and the roaming data; and
ranking two or more regions based on a number of the identified buildings having a poor in-building mobile coverage.

* * * * *